United States Patent [19]
Chakravarthy et al.

[11] Patent Number: 6,044,325
[45] Date of Patent: Mar. 28, 2000

[54] CONDUCTIVITY ANISOTROPY ESTIMATION METHOD FOR INVERSION PROCESSING OF MEASUREMENTS MADE BY A TRANSVERSE ELECTROMAGNETIC INDUCTION LOGGING INSTRUMENT

[75] Inventors: Srinivasa Chakravarthy; Pravin Gupta, both of Houston; Raghu Chunduru, Webster; Berthold F. Kriegshauser; Otto N. Fanini, both of Houston, all of Tex.

[73] Assignee: Western Atlas International, Inc., Houston, Tex.

[21] Appl. No.: 09/119,926

[22] Filed: Jul. 21, 1998

Related U.S. Application Data

[63] Continuation-in-part of application No. 09/042,982, Mar. 17, 1998.

[51] Int. Cl.[7] .................................................. G06F 19/00
[52] U.S. Cl. ............................................. 702/7; 706/929
[58] Field of Search .................................. 702/7, 6, 8, 10, 702/11, 12, 13; 706/929

[56] References Cited

U.S. PATENT DOCUMENTS

| | | |
|---|---|---|
| 5,251,286 | 10/1993 | Wiener et al. ............................ 702/12 |
| 5,300,770 | 4/1994 | Allen et al. ............................... 702/12 |
| 5,444,619 | 8/1995 | Hoskins et al. ........................... 702/13 |
| 5,828,981 | 10/1998 | Callender et al. ........................ 702/11 |

*Primary Examiner*—Donald E. McElheny, Jr.
*Attorney, Agent, or Firm*—Richard A. Fagin

[57] ABSTRACT

A method for generating an improved estimate of horizontal conductivity, dip angle, azimuth and anisotropy parameter of an earth formation penetrated by a wellbore from dual-frequency transverse electromagnetic induction measurements, comprising generating an initial estimate of the horizontal conductivity, dip angle, azimuth and anisotropy parameter from the dual-frequency transverse induction measurements made at each one of a plurality of base frequencies. The initial estimates from each of the plurality of base frequencies are input into a primary trained neural network, and the improved estimate is calculated by the trained neural network. The network is trained by generating models of earth formations each having a known value of horizontal conductivity, anisotropy parameter, dip angle and azimuth. Voltages which would be measured by the transverse electromagnetic induction instrument in response to each model are synthesized. Initial estimates from the synthesized voltages are calculated and the initial estimates and known values from each of the models are input to the neural network to cause it to learn a relationship between the initial estimates and the known values.

8 Claims, 8 Drawing Sheets

CONDUCTIVITY ANISOTROPY ESTIMATION METHOD FOR INVERSION PROCESSING OF MEASUREMENTS MADE BY A TRANSVERSE ELECTROMAGNETIC INDUCTION LOGGING INSTRUMENT

CROSS-REFERENCE TO RELATED APPLICATIONS

This application is a continuation-in-part of application Ser. No. 09/042,982 filed on Mar. 17, 1997, entitled, "Conductivity Anisotropy Estimation Method for Inversion Processing of Measurements Made by a Transverse Electromagnetic Induction Logging Instrument", and assigned to the assignee of this invention.

BACKGROUND OF THE INVENTION

1. Field of the Invention

The invention is related to the field of electromagnetic induction well logging for determining the electrical resistivity of earth formations penetrated by a wellbore. More specifically, the invention is related to methods for processing induction voltage measurements into representative values of the resistivity of the formations.

2. Description of the Related Art

Electromagnetic induction resistivity well logging instruments are well known in the art. Electromagnetic induction resistivity well logging instruments are used to determine the electrical conductivity (and its converse, resistivity) of earth formations penetrated by a wellbore. Measurements of the electrical conductivity are used for, among other things, inferring the fluid content of the earth formations. Typically, lower conductivity (higher resistivity) is associated with hydrocarbon-bearing earth formations.

The physical principles of electromagnetic induction resistivity well logging are described, for example, in, H. G. Doll, *Introduction to Induction Logging and Application to Logging of Wells Drilled with Oil Based Mud*, Journal of Petroleum Technology, vol. 1, p. 148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517, U.S. Pat. No. 5,157,605 issued to Chandler et al, and U.S. Pat. No. 5,452,762 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

One solution to the limitation of the induction instruments known in the art is to include a transverse transmitter coil and a transverse receiver coil on the induction instrument, whereby the magnetic moments of these transverse coils is substantially perpendicular to the axis of the instrument. Such a solution was suggested in, L. A. Tabarovsky and M. I. Epov, *Geometric and Frequency Focusing in Exploration of Anisotropic Seams*, Nauka, USSR Academy of Science, Siberian Division, Novosibirsk, pp. 67–129 (1972). Tabarovsky and Epov suggest various arrangements of transverse transmitter coils and transverse receiver coils, and present simulations of the responses of these transverse coil systems configured as shown therein. Tabarovsky and Epov also describe a method of substantially reducing the effect on the voltage induced in transverse receiver coils which would be caused by eddy currents flowing in the wellbore. The wellbore is typically filled with a conductive fluid known as drilling mud. Eddy currents which flow in the drilling mud can substantially affect the magnitude of voltages induced in the transverse receiver coils. The wellbore signal reduction method described by Tabarovsky and Epov can be described as "frequency focusing", whereby induction voltage measurements are made at more than one frequency, and the signals induced in the transverse receiver coils are combined in a manner so that the effects of eddy currents flowing within certain geometries, such as the wellbore, can be substantially eliminated from the final result. Tabarovsky and Epov, however, do not suggest any configuration of signal processing circuitry which could perform the frequency focusing method suggested in their paper.

A device which can measure "frequency focused" transverse induction measurements is described in co-pending patent application Ser. No. 08/686,848 filed on Jul. 26, 1996, entitled, "Method and Apparatus for Transverse Electromagnetic Induction Logging", and assigned to the assignee of this invention. Interpreting measurements made from conventional induction logging instruments such as described in U.S. Pat. No. 4,837,517, U.S. Pat. No. 5,157,605 issued to Chandler et al, and U.S. Pat. No. 5,452,762 issued to Beard et al typically involves a process known as inversion. Inversion includes generating an initial estimate of the probable spatial distributions of resistivity around the logging instrument, and using the estimated spatial distribution to generate an expected response of the particular logging instrument given the estimated spatial distribution of resistivity. Differences between the expected response and the measured response are used to adjust the model of spatial distribution. The adjusted model of spatial distribution is then used to generate a new expected instrument response. The new expected response is then compared to the measured response. This process is repeated until the difference between the expected response and the measured response reaches a minimum. The apparent spatial distribution of resistivity which generates this "closest" expected response is deemed to be the distribution which most probably represents the spatial distribution of resistivities in the earth formations surveyed by the induction logging instrument. See for example U.S. Pat. No. 5,703,773 issued to Tabarovsky et al.

A limitation to using inversion methods for processing signals such as from the instrument described in U.S. patent application Ser. No. 08/686,848 is that the signals represent such complex phenomena as to make an initial estimate of the spatial distribution of resistivity impracticable to determine.

SUMMARY OF THE INVENTION

The invention is a method for generating an improved estimate of horizontal conductivity, dip angle, azimuth and anisotropy parameter of an earth formation penetrated by a wellbore. The improved estimate is generated from dual-frequency transverse electromagnetic induction measurements. The method comprises generating an initial estimate of the horizontal conductivity, dip angle, azimuth and anisotropy parameter from the dual-frequency transverse induction measurements made at each one of a plurality of base frequencies. The initial estimates from each of the plurality of base frequencies are input into a primary trained neural network. The improved estimate of horizontal conductivity, anisotropy parameter, dip and azimuth is calculated by the trained neural network.

The neural network is trained by generating models of earth formations, each having a known value of horizontal conductivity, anisotropy parameter, dip angle and azimuth. Voltages which would be measured by the transverse electromagnetic induction instrument in response to earth formations having the physical parameters of each model are synthesized. Initial estimates from the synthesized voltages are calculated, and the initial estimates and known values from each of the models are input to the neural network to cause it to learn a relationship between the initial estimates and the known values in the models.

DESCRIPTION OF THE PREFERRED EMBODIMENT

1. Apparatus for Measuring Transverse Induction Signals

Figure 1:
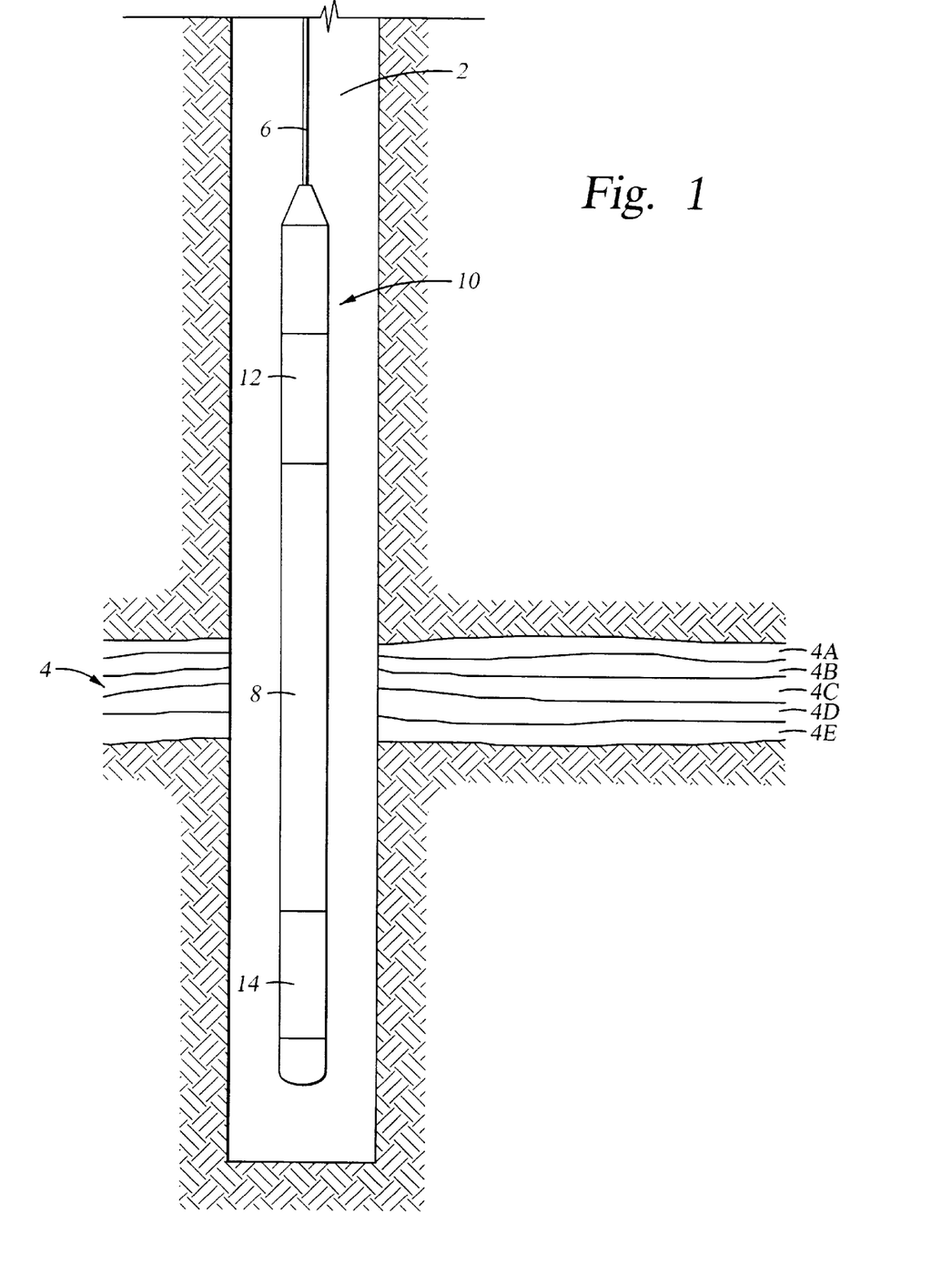
FIG. 1 shows an induction instrument disposed in a wellbore penetrating earth formations.

FIG. 1 shows an electromagnetic induction well logging instrument 10 disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14, as will be further explained, can include a signal generator and power amplifiers to cause alternating currents of selected frequencies to flow through transmitter coils in the coil mandrel unit 8.

The receiver/signal processing/telemetry electronics unit 12, as will be further explained, can include receiver circuits for detecting voltages induced in receiver coils in the coil mandrel unit 8, and circuits for processing these received voltages into signals representative of the conductivities of various layers, shown as 4A through 4F of the earth formations 4. As a matter of convenience for the system designer, the receiver/signal processing/telemetry electronics unit 12 can include signal telemetry to transmit the conductivity-related signals to the earth's surface along the cable 6 for further processing, or alteratively can store the conductivity related signals in an appropriate recording device (not shown) for processing after the instrument 10 is withdrawn from the wellbore 2.

Figure 2:
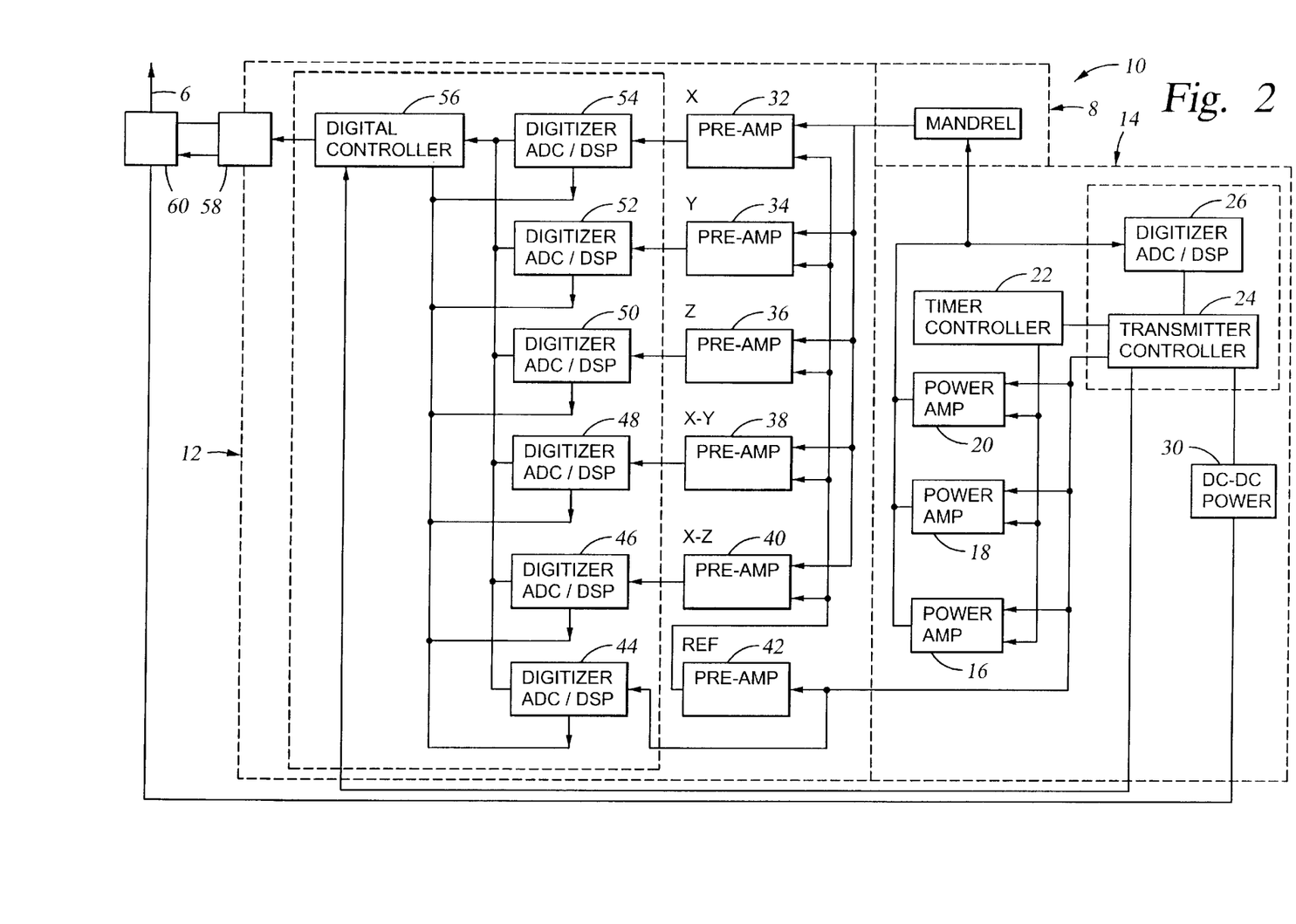
FIG. 2 shows a functional block diagram of the induction instrument of the invention.

The electrical configuration of the instrument 10 can be better understood by referring to a functional block diagram of the instrument 10 shown in FIG. 2. The auxiliary electronics unit 14 can include a transmitter controller 24 and a combination analog to digital converter/digital signal processing unit (ADC/DSP) 26, both of which are preferably enclosed in a thermal insulating flask 28. The flask 28 can be of a type known in the art and is provided to maintain stable temperature, and consequently stable frequency, of the transmitter controller 24 and ADC/DSP 26. The transmitter controller 24 and ADC/DSP 26 preferably receive electrical power from a DC-DC converter 30. The electrical power is preferably conducted along a power line 30A as direct current, so that as the power passes through the mandrel unit 8 on the way to the auxiliary electronics unit 14 the electrical power will not materially increase the amount of stray voltage induced in coils in the mandrel unit 8. The transmitter controller 24 can include a signal generator, which will be further explained, for generating an alternating voltage signal at two different frequencies. An analog signal output 24A of the transmitter controller 24 can be connected to a timer controller 22 which selectively operates, at an appropriate time as will be further explained, each of three power amplifiers 16, 18, 20. The output of each of the power amplifiers 16, 18, 20 is connected to one corresponding transmitter coil set (not shown in FIG. 2) in the mandrel unit 8.

The ADC/DSP 26 can be connected to a reference tap on the output of each power amplifier 16, 18, 20. A portion of the current flowing through each transmitter coil (located in the mandrel unit 8) from power amplifiers 16, 18, 20 is conducted provide a transmitter current reference for the transmitter controller 24, and for receiver circuits located in the receiver/signal processing/telemetry electronics unit 12, as will be further explained. The current so detected can be digitized in the ADC/DSP 26 to provide the transmitter current reference in digital form to the transmitter controller 24. The use of the transmitter current reference will be further explained.

The receiver/signal processing/telemetry electronics unit 12 can include preamplifiers 32, 34, 36, 38, 40 each of which is connected to one of the receiver coil sets (which will be further explained) in the coil mandrel unit 8. The output of each preamplifier can be connected to a corresponding analog-to-digital converter/digital signal processor (ADC/DSP), shown as 54, 52, 50, 48, 46 wherein the output of each preamplifier 32, 34, 36, 38, 40 is digitized and processed into a signal corresponding to the voltages induced in the corresponding receiver coil (not shown in FIG. 2) to which each preamplifier is connected. Timing of operation for the ADC/DSP circuits 54, 52, 50, 48, 46 can be provided by a controller 56. Preferably, controller 56 operates the ADC/DSP circuits 54, 52, 50, 48, 46 so that digital signal samples are made by the ADC portion of each ADC/DSP circuit at a predetermined time with respect to the generation of the alternating current flowing through the transmitter coils. The time can be determined by a clock and synchronization signals conducted over control line 30B from the transmitter controller 24. The controller 56 preferably times digitization from each ADC/DSP circuit so that the digital samples are synchronized with respect to the same signal phase in each cycle of the alternating voltage induced in each receiver coil. In this manner, the signal samples can be synchronously stacked to reduce noise in the signal output from each ADC/DSP circuit. A method of synchronous stacking signal digital signal samples to reduce noise is described in U.S. Pat. No. 5,452,762 issued to Beard et al. The ADC/DSP circuits 54, 52, 50, 48, 46 in the receiver/signal processing/telemetry electronics unit 12 can be similar in design to the ADC/DSP 26 in the auxiliary electronics unit 8 as a matter of convenience for the system designer.

The receiver/signal processing/telemetry electronics unit 12 can also include a calibration circuit 42 and an associated ADC/DSP circuit 44 connected thereto. A portion of the alternating current signal used to drive the power amplifiers 16, 18, 20 can be conducted to the calibration circuit 42 over analog signal line 30C. Analog signal line 30C is preferably electrostatically shielded to reduce parasitic induction of the alternating current signal into the receiver coils in the coil mandrel unit 8. On command from the controller 56, the calibration circuit 42 periodically conducts a sample of the alternating current to each of the receiver preamplifiers 32, 34, 36, 38, 40. Since the alternating current signal thus conducted to the preamplifiers is in each case substantially identical, small differences in response characteristics of each preamplifier can be determined. The alternating current signal conducted to the preamplifiers is also digitized in a separate ADC/DSP 44 to generate a reference signal for determining the response characteristics of each preamplifier. The digitized output of each preamplifier from ADC/DSP's 46–54 is conducted, along with the digitized reference to the controller, where the response of each preamplifier can be determined as the change in the reference signal corresponding to each preamplifier when compared to the reference signal. Any necessary adjustments to the response of the preamplifiers 46–54 may be performed numerically by adjusting the acquisition timing and numerical gain applied to digital samples from each ADC/DSP to match the measured difference in response between the reference signal and the output of each of the preamplifiers 46–54. This response calibration system is provided so that the measurements of the voltages induced in each receiver coil will be less affected by variations in response of each of the preamplifiers.

The controller 56 receives digital signal samples from each ADC/DSP connected to it and calculates the magnitudes of the voltages induced in each one of the receiver coils in the mandrel unit 8 based on the output of the respectively interconnected ADC/DSP's 54, 52, 50, 48, 46, 44. The induced voltage magnitudes thus calculated in the controller 56 may be conducted to a telemetry interface 58 for insertion into a signal telemetry format provided by a telemetry transceiver 60. The telemetry transceiver 60 can transmit signals to the earth's surface corresponding to the calculated magnitudes. Alternatively, magnitude values calculated in the controller 58 may be stored in an appropriate recording device (not shown) for processing after the instrument 10 is withdrawn from the wellbore (2 in FIG. 1).

Figure 3A:
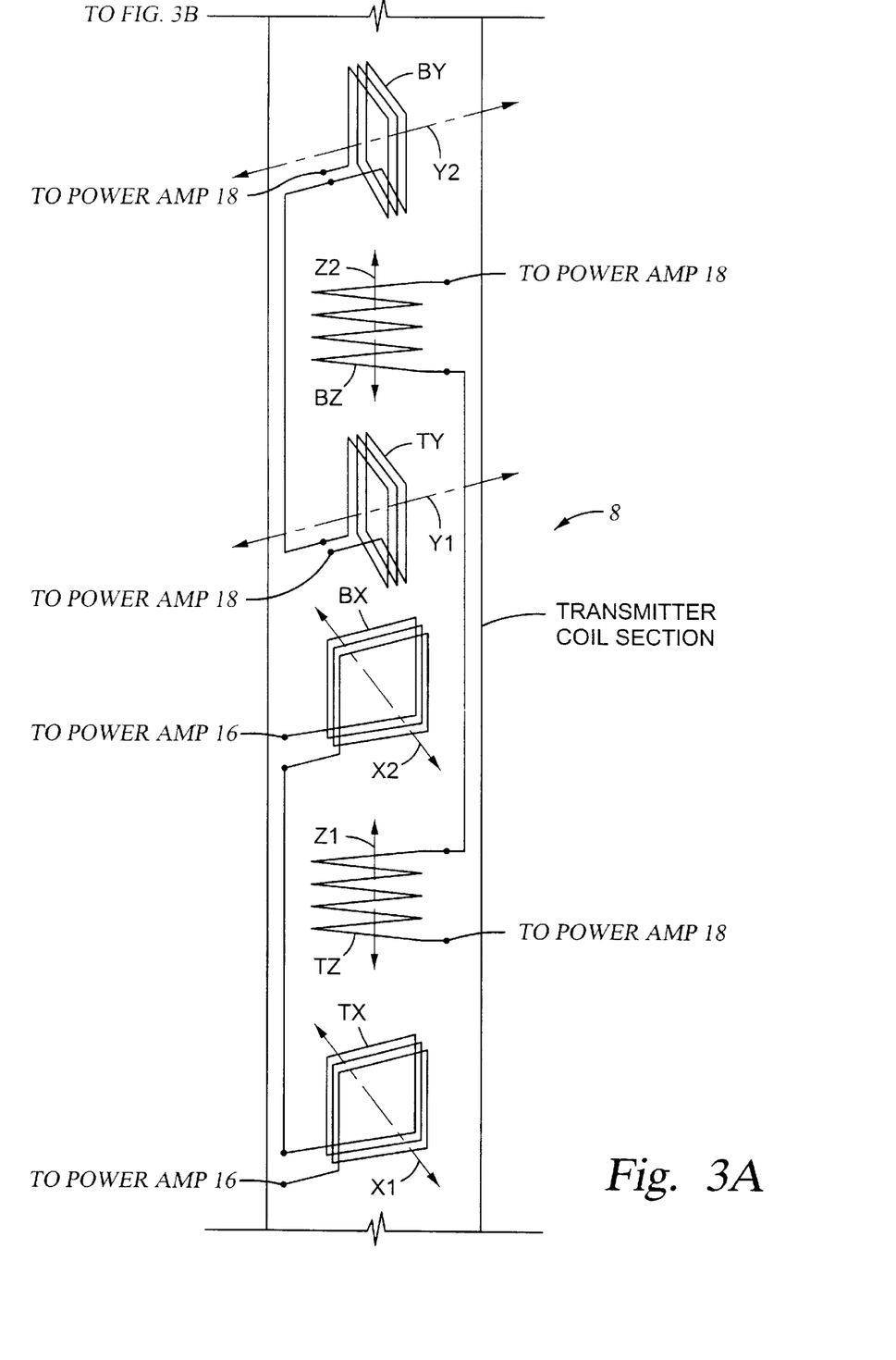
FIG. 3A shows the transmitter coil portion of the coil mandrel unit of the instrument in more detail.
Figure 3B:
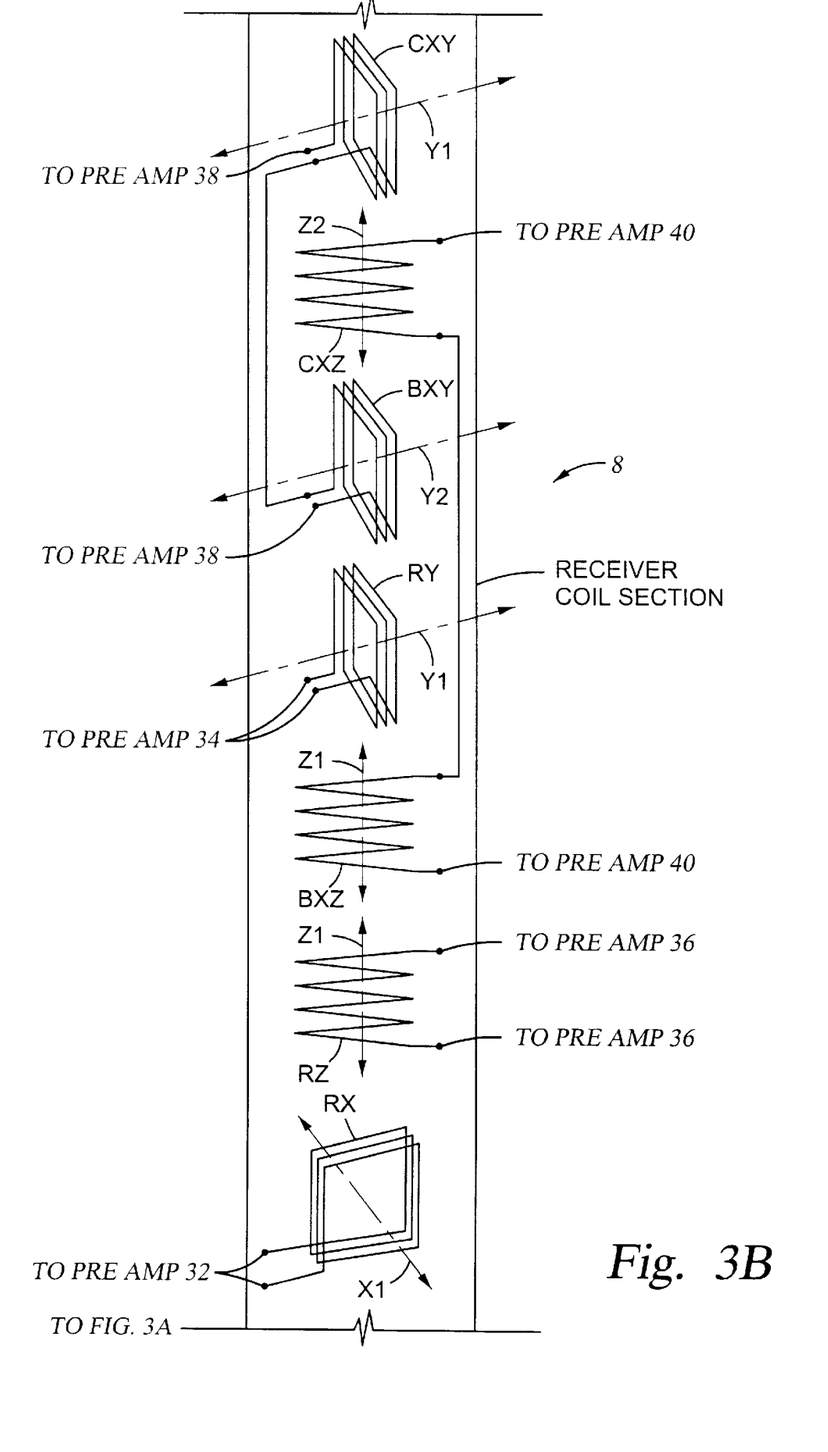
FIG. 3B shows the receiver coil portion of the coil mandrel unit of the instrument in more detail.

The arrangement of transmitter coils and receiver coils on the coil mandrel unit 8 can be better understood by referring to FIGS. 3A and 3B. The transmitter coil section of the coil mandrel unit 8 is shown in FIG. 3A. A transmitter coil which can be wound so that its axis, and thereby its magnetic moment, is along an axis X1 is shown at TX. Axis X1 by convention will be referred to as being parallel to the X-axis. Coil TX is preferably substantially perpendicular to the axis of the instrument (10 in FIG. 1). Coil TX can be electrically connected to the output of one of the power amplifiers (such as 16 in FIG. 2). When alternating current flows through transmitter coil TX, an alternating electromagnetic field is in induced, which causes eddy currents to flow in "ground loops" in the wellbore (2 in FIG. 1) and in the earth formation (4 in FIG. 1) substantially coaxially about axis X1 and parallel to the axis of the mandrel unit 8 and the instrument (10 in FIG. 1).

A short distance along the axis of the coil mandrel unit 8 can be another transmitter coil TZ. Coil TZ can be wound so that it axis Z1 is substantially parallel to the axis of the instrument 10 (which by convention is generally referred to as the Z-axis). Coil TZ can be connected to the output of another one of the power amplifiers (such as 20 in FIG. 2). Alternating current passing through coil TZ induces eddy currents in the wellbore 2 and formation 4 which flow in ground loops substantially coaxial with axis Z1 and substantially perpendicular to the axis of the mandrel unit 8.

Located a short distance further along the axis of the mandrel unit 8 can be a mutual balancing or "bucking" coil BX, corresponding to the X-axis transmitter coil TX. The winding axis X2, and therefore the magnetic moment, of coil BX can be substantially parallel to the axis X1 of coil TX. Coil BX can be series connected in opposite polarity to coil TX, between coil TX and power amplifier 16. Bucking coil TX provides that the output of a corresponding X-axis receiver coil (which will be further explained) is substantially zero when the instrument is disposed in a non-conductive medium such as air. As is understood by those skilled in the art, using "bucking" coils to null the corresponding receiver coil output in a non-conductive environment can be performed either by providing such bucking coils connected in series with the corresponding receiver coil, or alternatively can be connected in series with the transmitter coil. In the present embodiment of the invention it is preferable to provide a bucking coil in series with the corresponding transmitter coil to simplify impedance matching between the corresponding receiver coil and its associated preamplifier (such as 44 in FIG. 2), and thereby to improve the ability of the circuitry associated with each receiver coil to handle signals over a wide frequency range. The reactance of a bucking coil and its associated wiring would complicate impedance matching, and adjusting for signal response characteristics for a wide band response receiver coil, when connected in series with the receiver coil because this reactance is frequently nearly the same as the reactance of the receiver coil.

Still another short distance along the axis of the mandrel unit 8 is a Y-axis transmitter coil TY. Coil TY is preferably wound so that its axis Y1, and therefore its magnetic moment, are substantially perpendicular to both the axis of the instrument 10 and to the magnetic moment of coil TX. Coil TY can be connected to power amplifier 18. Alternating current flowing through coil TY induces a magnetic field which causes eddy currents to flow in the wellbore 2 and the earth formation 4 in ground loops substantially coaxial with axis Y1 and parallel to the axis of the instrument 10. The eddy current ground loops corresponding to coil TY would also be substantially perpendicular to the ground loops associated with coils TX and TZ if the coils TX, TY, TZ are arranged as described herein.

Bucking coils associated with transmitter coils TZ and TY are shown at BZ and BY, respectively. Bucking coils BZ and BY are electrically connected between their respective transmitter coils TZ, TY and power amplifiers 20, 18 in opposite polarity, as is bucking coil BX. Bucking coil BZ is wound to have its axis and magnetic moment along Z2 and BY is wound to have its axis and magnetic moment along Y2. Z2 is substantially parallel to Z1, and Y2 is substantially parallel to Y1.

A suitable arrangement of receiver coils for the invention is shown in FIG. 3B. At the lowermost end of the receiver coil section of the coil mandrel unit 8 can be an X-axis receiver coil RX. Coil RX can be wound so that its sensitive direction is parallel to axis Xl as for transmitter coil TX (shown in FIG. 3A). Eddy currents flowing in ground loops corresponding to coil TX will induce voltages in coil RX proportional in magnitude to the magnitude of the previously explained TX-related eddy currents. The eddy currents themselves are proportional to the electrical conductivity in the path of these ground loops.

A short distance along the axis of the coil mandrel unit 8 is a Z-axis receiver coil RZ wound to have its sensitive direction substantially parallel to Z1, as for its corresponding transmitter TZ. Eddy currents flowing in the previously explained ground loops related to coil TZ will induce voltages in coil RZ proportional to the magnitude of these eddy currents.

The mandrel unit 8 can include a Y-axis receiver coil having a sensitive direction parallel to Y1 and is shown at RY. Eddy currents associated with coil TY will induce similar type voltages in coil RY.

If the layers of the earth formations (4A through 4F in FIG. 1) are substantially perpendicular to the axis of the mandrel unit 8, then measurements made by the Z-axis coils in combination with measurements made by either the X- or Y-axis coils would be sufficient to resolve anisotropy of the conductivity of the earth formations. It is frequently the case, however, that the layers 4A-4F are not perpendicular to the axis of the mandrel unit 8 either because the wellbore (2 in FIG. 1) is inclined from vertical, or the layers 4A–4F are not horizontal (referred to in the art as "dipping beds") or a combination of these two factors. Therefore in order to resolve the anisotropy of the conductivity, the coil mandrel unit 8 of the invention preferably includes cross-axial receiver coils. One such cross-axial receiver coil is shown at CXY. Coil CXY receives voltages induced as a result of eddy current magnetic fields which are parallel to the Y1 axis (parallel to the magnetic moment of the Y-axis transmitter coil TY). These eddy currents may be induced as a result of current flowing through transmitter coil TX. As previously explained, coil TX includes bucking coil BX to null the output of receiver coil RX in a non-conductive environment. Since coil CXY is located at a different axial spacing than coil RX, however, nulling the output of coil CXY would require a bucking transmitter coil located at a different axial position than coil BX. As a matter of convenience for the system designer, the output of coil CXY can be nulled by including a receiver bucking coil connected in series and opposite polarity with coil CXY. This receiver bucking coil is shown at BXY. Methods of adjusting the axial position of receiver bucking coils such as BXY to null the output of the corresponding receiver coil CXY are well known in the art. The present embodiment of the invention includes cross-component coil CXY instead of merely using receiver coil RY for the same reason as coil CXY includes associated bucking coil BXY, namely that nulling the output of receiver coil RY to match transmitter coil TX in a non-conductive environment would require the use of an additional bucking coil for cross component detection, as well as the original bucking coil for direct detection of the signal from its associated transmitter coil (TY in this case). As a matter of convenience for the system designer the present embodiment includes separate cross-component coils such as CXY. It is to be understood that RY could be used for cross-component detection when combined with an appropriate bucking coil, and therefore the use of separate cross-component coils should not be construed as a limitation on the invention.

Another cross-axial receiver coil which can be included in the invention is shown at CXZ. Coil CXZ receives voltages induced along the Z-axis caused by eddy currents flowing in the earth formation as a result of current flowing through the X-axis transmitter coil TX (along X1). Coil CXZ can include a receiver bucking coil BXZ similar in function to bucking coil BXY. Adjusting the combined output of coils BXZ and CXZ to be zero in a non-conductive environment can be performed in a similar manner to that used to null the combined output of coils CXY and BXY in a non-conductive environment.

The electrical connections between the receiver coils and the receiver/signal processing/telemetry electronics unit (12 in FIG. 2) can be better understood by referring once again to FIG. 2. Receiver coil RX can be connected to the input of preamplifier 32. Receivers RY and RZ are connected, respectively, to the inputs of preamplifiers 34 and 36. Cross-axial receiver coil CXY and bucking coil BXY are series connected to the input of preamplifier 38. Cross-axial receiver coil CXZ and bucking coil BXZ are series connected to the input of preamplifier 40. Preamplifiers 32–40 are each selected to provide a signal output level compatible with the dynamic range of analog to digital converter portion of the ADC/DSP circuit connected the output of each preamplifier. As previously explained, each preamplifier 32, 34, 36, 38, 40 can be connected to an associated ADC/DSP 54, 52, 50, 48, 46.

The ADC/DSP's 54, 52, 50, 48, 46 each generate digital samples of the output of the preamplifier connected to it. The acquisition of the digital samples is timed by the controller 56. The controller 56 can be programmed to cause each associated ADC/DSP to generate digital samples of the output of the corresponding preamplifier. The controller 56 commands each ADC/DSP to generate a plurality of samples during each cycle of the alternating current flowing through each of the transmitter coils. These digital signal samples can be timed to have a predetermined phase with respect to the alternating voltages induced in each of the receiver coils RX, RY, RZ, CXY, CXZ. The significance of the timing of the digitization will be further explained.

Figure 4:
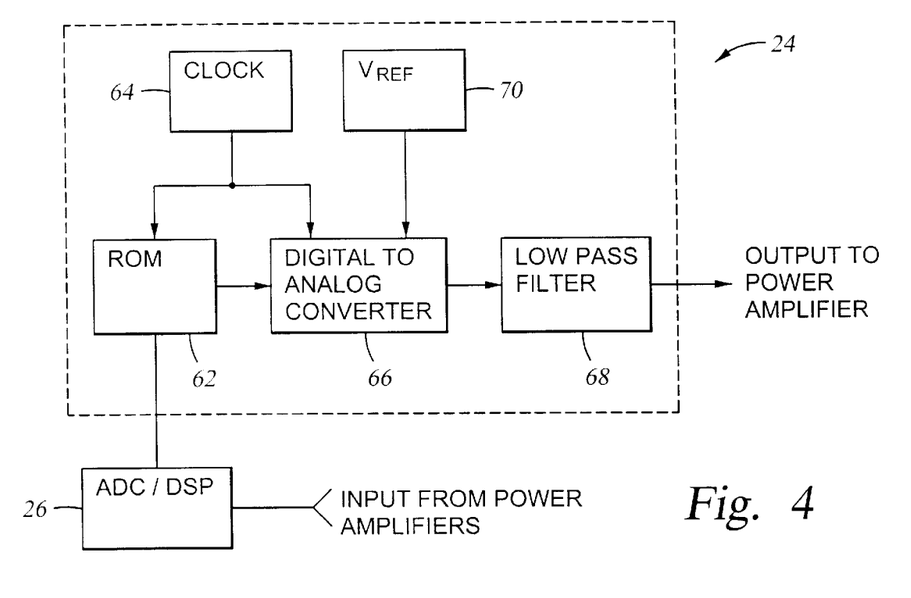
FIG. 4 shows a functional block diagram of a transmitter controller and signal generator for the instrument.

The hardware configuration of the instrument 10 having been explained, the timing and control of the power amplifiers (16, 18, 20 in FIG. 2) and the ADC/DSP's (54, 52, 50, 48, 46 in FIG. 2) will be explained in more detail. Referring now to FIG. 4, the transmitter controller 24 can include a read only memory (ROM) 62 which contains a digital representation of the desired waveform of the current to be passed through transmitter coils (TX, TY, TZ in FIG. 3A). The digital representation typically consists of numbers corresponding to the magnitude of the desired waveform sampled at spaced apart time intervals. The output of the ROM 62 is timed by a clock 64, which may form part of the transmitter controller 24, so that the numbers exit the ROM 62 at spaced apart time intervals and are conducted to a digital to analog converter (DAC) 66. The DAC 66 converts the numbers conducted sequentially from the ROM 62 into corresponding fractional amounts of a reference voltage source [$V_{ref}$] 70 connected to the DAC 66. The output of the DAC 66 then consists of analog voltages proportional to the numbers input from the ROM 62. Since the output of the DAC 66 changes in step with each new number conducted from the ROM 62, the DAC 66 would appear if graphed as a series of "stair-steps" The output of the DAC 66 is therefore preferably conducted to a low-pass filter 68 to smooth the "stair-step" like output of the DAC 66 into a continuous, smooth waveform. The output of the filter 68 can be conducted to the input of each power amplifier (16, 18, 20 in FIG. 2). It is to be understood that using the digital circuit just described herein for generating a driver signal for the power amplifiers 16, 18, 20 is a matter of convenience for the system designer and is meant only to serve as an example of circuits which could generate the desired transmitter current waveform. Analog signal generator circuits could as easily perform the required signal generation function.

As previously explained, a reference tap on each power amplifier 16, 18, 20 conducts a portion of the transmitter current to the ADC/DSP 26 in the auxiliary electronics unit 14. The ADC/DSP 26 generates digital samples of the transmitter current and conducts the samples to the transmitter controller 28. The transmitter controller 28 can calculate differences between the digitized samples of the transmitter current and the numbers stored in the ROM 62. These differences can include changes in amplitude and phase of the transmitter current with respect to the desired amplitude and phase of the transmitter current. These differences can be used to generate adjustment factors for the numbers stored in the ROM 62 so that the desired amplitude and phase can be more closely generated in the transmitter current. It is to be understood that analog circuitry known in the art can be used to perform the adjustments to the transmitter current waveform as just described. The use of the digital circuitry described herein for adjusting the transmitter current waveform is a matter of convenience for the system designer and is not meant to limit the invention. The changes calculated between the numbers in the ROM 62 and the digitized transmitter current can also include a number of cycles of the clock 64, whereby can be determined the actual phase of the transmitter current with respect to the apparent phase of the transmitter current waveform as synthesized by the numbers output from the ROM 62. It is contemplated that the clock 64 can have a sufficiently high frequency whereby this phase difference can be determined to a very high degree of precision. The number of clock cycles of phase difference can be conducted to the controller (56 in FIG. 2) in the telemetry unit (12 in FIG. 2) over a serial link, shown in FIG. 2 as 30B. The clock 64 can be used to operate both the transmitter controller 28 and the controller (56 in FIG. 2) so that generation of digital signal samples of the receiver voltages can be more accurately synchronized to the transmitter current.

A method of signal processing known as "frequency focusing" enables determination of the conductivity of the earth formations, particularly in directions along the X- and Y-axes, while substantially excluding the effects of eddy currents flowing in the wellbore (2 in FIG. 1). In a novel aspect of the invention, frequency focusing can be performed by having the transmitter current waveform include sinusoids at two different frequencies, combined in a predetermined relationship of amplitude and phase between each component frequency. The frequency for the transmitter current can be within a range of about 10–70 KHz for the first frequency and about 30–210 KHz for the second frequency, as will be further explained.

In the present embodiment of the invention, the transmitter current waveform, represented by $I_T$, should follow the relationship:

$$I_T = I_{T1} + I_{T2} \quad (1)$$

where $I_{T2}$, and $I_{T2}$ represent, respectively, the transmitter current waveforms at the first $\omega_1$, and the second $\omega_2$ component frequencies, and where the relative amplitudes of $I_{T1}$ and $I_{T2}$ follow the relationship:

$$I_{T1} = I_0 \sin(\omega_1 t) \quad (2)$$

$$I_{T2} = \left(\frac{\omega_1}{\omega_2}\right)^2 I_0 \sin(\omega_2 t)$$

where $I_0$ represents an arbitrary reference magnitude, typically proportional to the level of $V_{ref}$ (70 in FIG. 4). It is desirable for $\omega_2$ to be an odd-number harmonic multiple of $\omega_1$, and in the preferred embodiment, $\omega_2$ is the third harmonic. The transmitter current waveforms at the two component frequencies should have the same initial phase (zero) at the beginning of each cycle of the transmitter current at the first frequency. It has been determined that if the transmitter current follows the magnitude relationship described in equation (2), then the desired signal characteristics of the voltages induced in the receiver coils (RX, RY, RZ, CXY, CXZ in FIG. 3B) can be determined by directly measuring components of the induced voltages which have a certain time relationship with respect to the current flowing through the transmitter coils (TX, TY, TZ in FIG. 3A) at the first frequency. The components, at these times, of the voltages induced in the receiver coils by a two-frequency magnetic field having the frequency, phase and amplitude relationship described in equations, and 2 are inherently substantially insensitive to voltages induced by eddy currents flowing in the wellbore (2 in FIG. 1) and are substantially correspondent only to the magnitude of the eddy currents flowing only in the earth formations. By selecting the two component frequencies and relative amplitudes for the transmitter current waveform as described in equation (2), the conductivity of the earth formation can be directly related to the difference between the components of the induced voltages at each component frequency.

In this embodiment of the invention, the difference in the magnitudes of the components of the induced voltages at the two frequencies can be measured directly by programming the controller (56 in FIG. 2) to time acquisition of digital signal samples, represented by $t_n$, to occur twice during each full cycle of the transmitter voltage at the first (lower) frequency according to the expression:

$$t_n = \frac{(n + 1/2)\pi}{\omega_1} \qquad (3)$$

The digital samples of the induced voltages in the receiver coils made at these times will directly represent the difference in magnitude between the components of the induced voltage at each frequency. The digital signal samples made at these times can then be directly related to the conductivity of the earth formations.

Figure 5A:
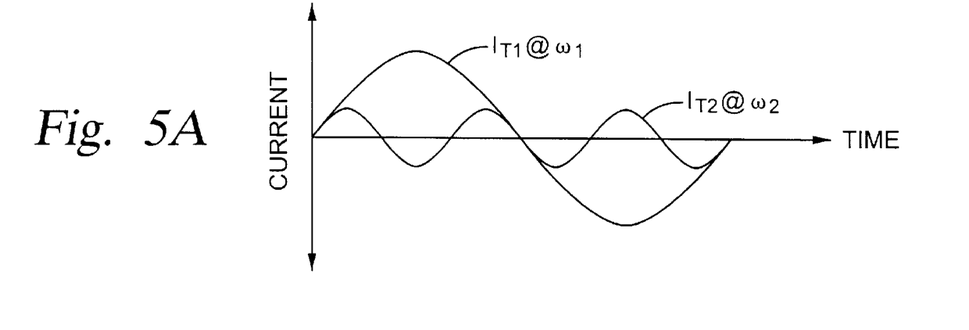
FIG. 5A shows a graph of the component frequencies of the transmitter current.
Figure 5B:
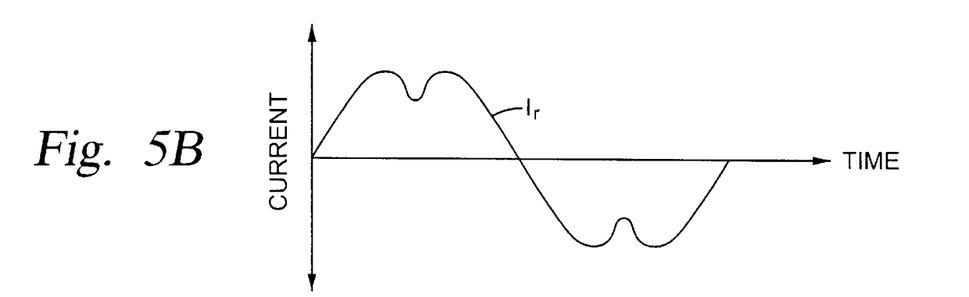
FIG. 5B shows a graph of the composite waveform of the transmitter current.
Figure 6A:
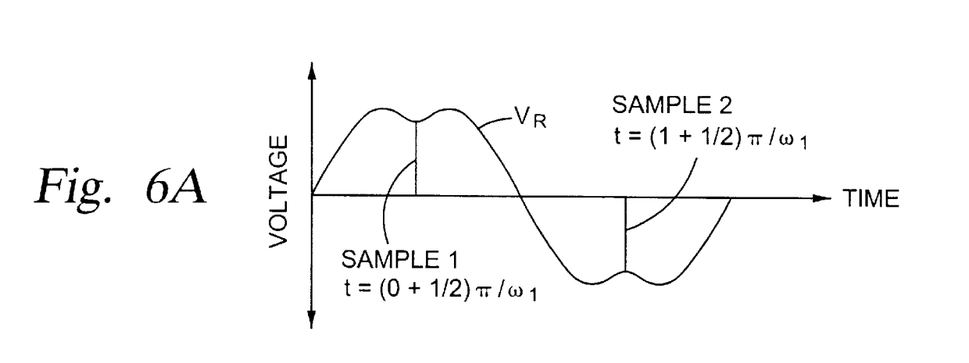
FIG. 6A show a graph of the voltage induced in the receiver coil as a result of the current shown in FIG. 5B flowing through the transmitter coil.
Figure 6B:
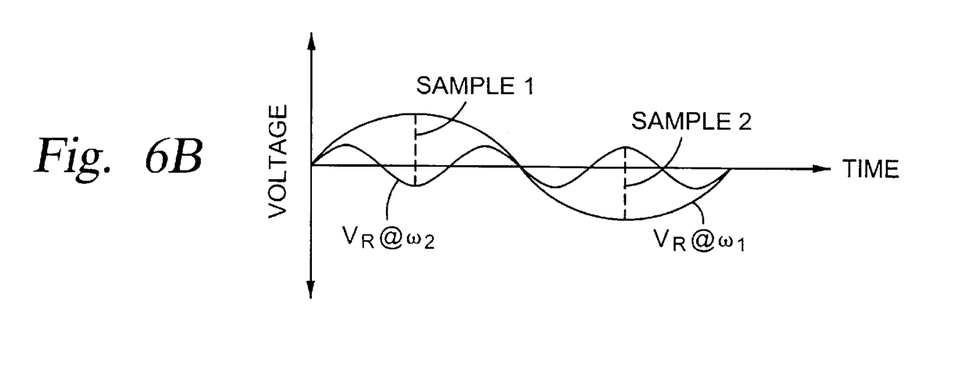
FIG. 6B shows the components of the voltage induced in the receiver and how digital samples made at certain times represents the difference in peak amplitude between the two components of the induced voltage.

The manner in which the magnitude of these digital signal samples directly represents the difference between the induced voltage magnitudes at the first and second component frequencies can be better understood by referring to FIGS. 5A, 5B, 6A and 6B. FIG. 5A shows a graph of each of the two frequency components of the alternating current flowing through the transmitter coil. The current magnitude at the first frequency is represented by curve $I_{T1}$, and the current magnitude at the second frequency is shown by curve $I_{T2}$. As previously explained, the second frequency can be the third harmonic multiple of the first frequency and have an amplitude relationship as previously described in equation (1). The composite current waveform is shown in FIG. 5B as $I_T$. The voltage which is induced in the receiver coil as a result of eddy currents flowing in the formation is shown in FIG. 6A, wherein the eddy currents are induced by the magnetic field generated by the current ($I_T$ in FIG. 5B) flowing through the transmitter coil. Digital signal samples can be made at times shown in FIG. 6A. Sample 1 is shown as timed to be at one-quarter cycle at the first frequency (½π/ω$_1$). This time corresponds to n=0 in equation (3). Sample 2 is shown timed at three-quarter of the cycle at the first frequency (³⁄₂π/ω$_1$), which corresponds to n=1 in equation (3). The reason that digital samples made at these relative times represent the difference in magnitudes between the receiver voltage components at the first and at the second frequencies can be better understood by referring to FIG. 6B, which shows the receiver voltage as its individual frequency components: at the first frequency, shown by curve $V_R @ \omega_1$; and at the second frequency, shown by curve $V_{R @ \omega_2}$. If the alternating current were applied at each frequency individually to the transmitter coil, the voltage induced in the receiver coil would be shown by the individual component curves as in FIG. 6B. If the current at the second frequency has the frequency and timing relationship with respect to the current at the first frequency, as described herein, the induced voltage at the first frequency will reach a peak value at the times at which the induced voltage at the second frequency will reach a peak value but at the opposite polarity. Since the two frequencies of current are superimposed (passed through the transmitter simultaneously), samples of the voltage induced in the receiver coil taken at the times shown in FIG. 6B, such as SAMPLE 1 and SAMPLE 2, will therefore directly represent the difference between the peak magnitudes of the induced voltage components at the first and at the second frequency.

Referring once again to FIG. 2, when the instrument 10 is first energized, the transmitter controller 24 begins to generate a full cycle of the transmitter voltage waveform. The output of the transmitter controller 24, as previously explained, is conducted to the timer controller 22. In the preferred embodiment of the invention, X-, Y, and Z-axis measurements can be conducted sequentially. The transmitter controller 24 can send a command signal to the timer controller 22 to cause it to actuate the particular power amplifier (such as X-axis amplifier 16) whose transmitter coil connected thereto corresponds to the axis along which the particular measurement is to be made. It is contemplated that a sufficiently precise measurement can be made by operating the transmitter controller through about 1,000 transmitter voltage waveform cycles at the first (lower) frequency, although this number of cycles is not to be construed as a limitation on the invention. For example, if the instrument 10 is to be moved relatively slowly through the wellbore (2 in FIG. 1), then a larger number of cycles may be useable in order to obtain higher accuracy measurements.

After the transmitter controller has operated through about 1,000 cycles, the transmitter controller 28 can instruct the timer controller 22 to operate another one of the amplifiers, such as Y-axis amplifier 18, to conduct the alternating current to its associated transmitter coil (TY in FIG. 3A). After about another 1,000 cycles, the transmitter controller 28 can instruct the timer controller to repeat the process for the remaining (Z-axis) power amplifier 20, and after about 1,000 cycles of alternating current have passed through the Z-axis transmitter coil (TZ in FIG. 3A), the entire process can be repeated.

During transmission from a particular transmitter coil, the controller 56 sends command signals to the ADC/DSP's 46–54 which are connected to the receiver coils which are to be detected during operation of each particular transmitter coil. For example, during operation of X-axis transmitter coil TX, ADC/DSP's 54 (connected to preamplifier 32, which is connected to X-axis receiver coil RX) and 48 (connected to preamplifier 38, which is connected to cross-component receiver coil CXY) and 46 (connected to preamplifier 40, which is connected to cross-component receiver coil CXZ) are instructed to digitize the output of the associated preamplifiers. The controller 56 can instruct the corresponding ADC/DSP's to generate digital signals samples at the exact times described in equation (3) with respect to the transmitter voltage. Alternatively, the ADC/DSP's can generate at least four samples for each cycle at the second (higher) frequency. Since the controller 56 and the transmitter controller 24 can be timed by the same clock (64 in FIG. 4), the exact time of generating the digital signal samples must be adjusted by the phase delay determined as previously described in the transmitter controller 24. The controller 56 can delay sending instruction to digitize the preamplifier output by the number of clock cycles of phase delay conducted from the transmitter controller 24 with respect to a start of transmitter voltage cycle command. The start of transmit cycle command can also be sent along the serial link 30B to indicate to the controller 56 that the transmitter controller 24 is initiating a transmitter voltage cycle. The digital signal samples acquired during the transmitter voltage cycle can be synchronously stacked, as previously described herein, and can be stored in a buffer (not shown separately) in the controller 56 for transmission to the surface by the telemetry transceiver 60, or can be retained for later processing. As previously described, the samples from each ADC/DSP 54–46 can be processed by a discrete Fourier transform to determine the magnitude of the voltage components at each frequency, or the samples made at the precise times described in equation (3) can be used to determine the difference in the in-phase voltage components directly.

After the previously described number of transmitter voltage cycles (which as previously explained can be about 1,000), the controller 56 can send digitization commands to the ADC/DSP associated with the receiver coil which will receive voltages induced by its axially associated transmitter coil (such as ADC/DSP 52 associated with coils RY and TY). The receiving and digitization process can then be repeated for the remaining transmitter coil and axially associated receiver coil.

2. Processing Transverse Induction Signals into Initial Estimates of the Spatial Distribution of Electrical Conductivity Around the Logging Instrument The principle of the invention can be illustrated by an idealized situation wherein the earth formation is electrically anisotropic and the well logging instrument such as described herein is oriented so that the magnetic dipoles of some of its transmitters and receivers are parallel to the principal directions (principal axes) of the electrical anisotropy. If the well logging instrument described herein were so disposed in such an anisotropic earth, the voltage measurements which would be made by the various receiver coils in the instrument could be directly related to the conductivity values of the earth formation along each of the principal directions of the anisotropy. Note that in this idealized situation, there would be substantially no relationship between the magnitudes of voltages induced in the cross-component receiver coils (CXY, CXZ in FIG. 3B) and the conductivity of the formation.

Figure 7:
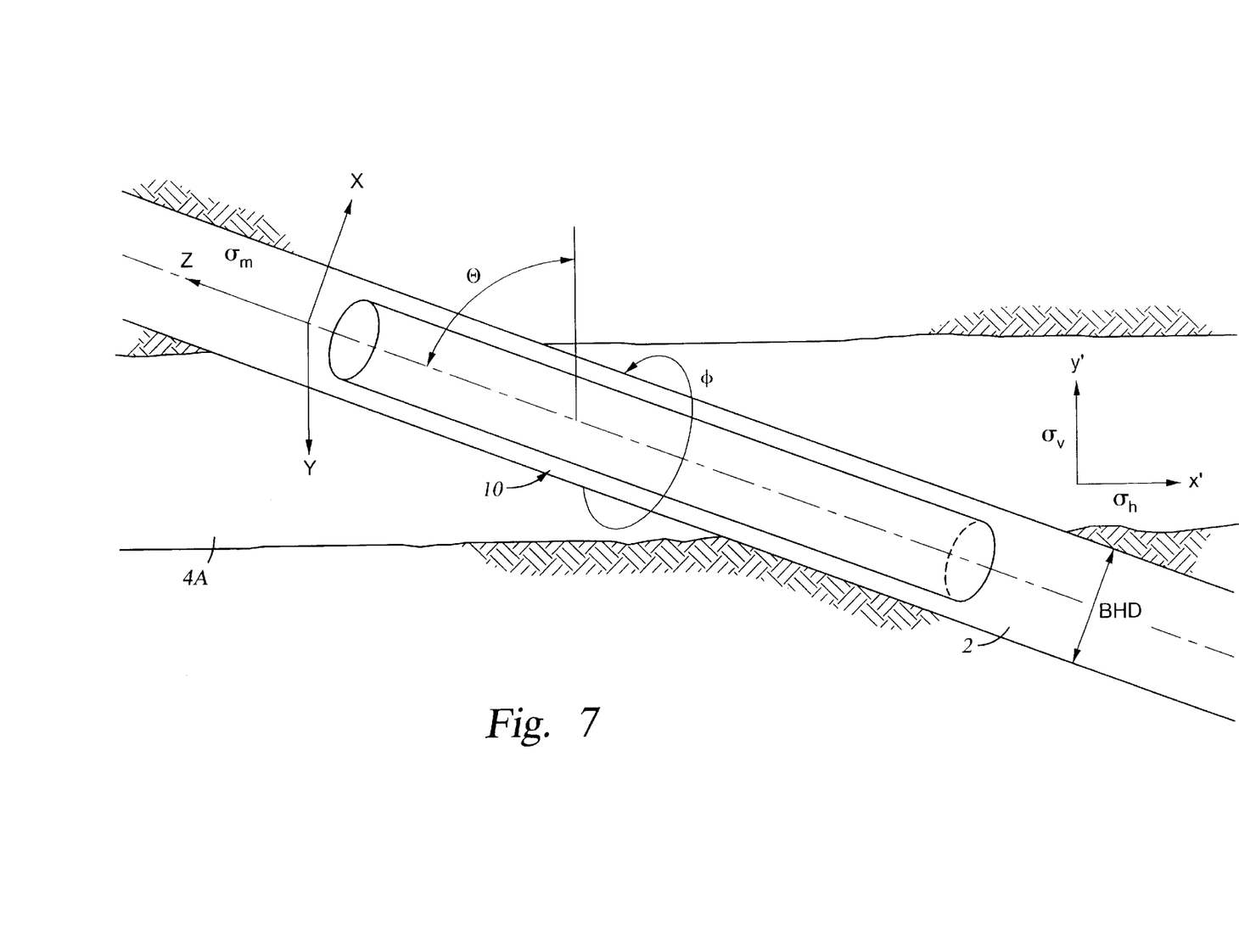
FIG. 7 shows the logging instrument inserted in a wellbore to explain the relative orientation of the instrument with respect to anisotropy axes of the earth formations.

The well logging instrument (10 in FIG. 1), however, will typically not be oriented so that the magnetic dipoles of the transmitters and receivers are parallel to the principal directions of anisotropy of the formations. The receiver voltage measurements therefore cannot be directly related to the electrical conductivity along the principal directions of the anisotropy. Referring now to FIG. 7, as is well known in the art the wellbore 2 may be inclined from vertical at any particular axial position along its length, and/or the earth formations, such as illustrated by formation layer 4A, may be inclined with respect to horizontal (the inclination angle known in the art as "dip"). A relative angle $\theta$ may be subtended between the axis of the instrument 10 shown as z and a "vertical" principal axis of the layer 4A shown by z'. The vertical principal axis is defined for purposes of this explanation as being substantially perpendicular to the layering attitude or "bedding planes" of the earth formation, such as shown for layer 4A. The electrical conductivity of the formation layer 4A measured in a direction parallel to the vertical principal axis can be defined as the "vertical" conductivity, $\sigma_v$. The angle subtended, $\theta$, will depend on, among other things, both the inclination of the formation layer 4A from horizontal (with respect to earth's gravity) and the inclination of the wellbore 2 from vertical (with respect to earth's gravity).

Similarly as for the vertical principal axis, a "horizontal" principal axis, x' can be defined as being substantially parallel to the bedding plane of the formation layer 4A. The electrical conductivity of the formation measured parallel to the horizontal principal axis can be referred to as the "horizontal" conductivity and can have a value represented by $\sigma_h$. The X- or Y- axes of the logging instrument 10 may subtend an angle of rotation, represented by $\phi$, with respect to the plane in which the horizontal principal axis of the formation layer 4A lies. For purposes of explaining this invention, it will be assumed that the vertical principal axis z' is vertical with respect to the earth's gravity and that the horizontal principal axis x' is perpendicular to earth's gravity. It should be understood, however, that the method of the invention is applicable to any other orientation of the vertical principal axis z' and horizontal principal axis x' with respect to earth's gravity.

Angle $\theta$ can be estimated directly from some of the receiver voltage measurements. There are five receiver voltage measurements made by the instrument described herein and these can be defined in terms of the transmitter magnetic field orientations and the receiver dipole directions they relate to such as $H^f_{xx}$ to represent the RX receiver coil measurement made from the magnetic field generated by the TX transmitter coil. The other receiver measurements include $H^f_{xy}$, $H^f_{yy}$, $H^f_{xz}$, $H^f_{zz}$. The five receiver voltage magnetic field representations can be represented for simplicity by a tensor $H^f$. Angle $\theta$ can be calculated from the XY cross-component ($H^f_{xy}$) and the XX and YY magnetic field components ($H^f_{xx}$, $H^f_{yy}$, respectively) of tensor $H^f$ by the expression:

$$\tan(2\phi) = \frac{2H^f_{xy}}{H^f_{xx} - H^f_{yy}} \tag{4}$$

Once the angle $\phi$ has been estimated, an intermediate magnetic field component tensor $H^i$ can be determined by rotation of $H^f$ through an angle of magnitude $(-\phi)$. From the intermediate magnetic field component tensor, $H^i$, the angle $\theta$ can then be estimated by the expression:

$$\tan(2\theta) = \frac{2H^i_{xz}}{H^i_{xx} - H^i_{zz}} \tag{5}$$

After the angle $\theta$ is estimated, the tensor $H^i$ can be converted into the coordinate system of the principal axes x' and z', by rotating through an angle of magnitude $(-\theta)$. The resulting tensor, referred to as H represents the magnetic field components that would be measured if the instrument's transmitter and receiver dipoles were parallel to the principal axes of the earth formation layers. Particularly, the X-axis is defined as being coplanar with $\sigma_h$, and the Z-axis is defined as being parallel to $\sigma_v$.

The voltages induced in an X-axis receiver coil (such as RX in FIG. 3B) by the magnetic field generated by an X-axis transmitter (such as TX in FIG. 3A) can be expressed in terms of this magnetic field, defined as $H_{xx}$, by the following expression:

$$H_{xx} = \frac{M_x}{4\pi r^3}[[(\sin\theta\cos\phi)^2 A_u - B_u]E_u + I_0 - (\sin\theta\sin\phi)^2 I_i] \tag{6}$$

Similarly, the voltages induced in a Y-axis receiver by the magnetic field generated by a Y- axis transmitter, represented by $H_{yy}$, can be expressed as:

$$H_{yy} = \frac{M_y}{4\pi r^3}[[(\sin\theta\cos\phi)^2 A_u - B_u]E_u + I_0 - (\sin\theta\sin\phi)^2 I_i] \qquad (7)$$

Z-axis receiver voltages induced by the magnetic field from a Z-axis transmitter, $H_{zz}$, can be expressed as:

$$H_{zz} = \frac{M_z}{4\pi r^3}[\cos^2(\theta)A_u - B_u]E_u \qquad (8)$$

Cross-component voltages, $H_{xz}$, as measured by a receiver coil such as CXY in FIG. 3B, and resulting from the magnetic field generated by a transmitter coil such as TX in FIG. 3A can be represented by the expression:

$$H_{xy} = \frac{M_x}{4\pi r^3}[A_u E_u + I_1]\sin^2\theta\cos\phi\sin\phi \qquad (9)$$

Cross-component voltages, $H_{xz}$, measured by a receiver coil such as CXZ in FIG. 3B from the magnetic field generated by a transmitter coil such as TX in FIG. 3A can be described by the expression:

$$H_{xz} = \frac{M_x}{4\pi r^3}\cos\theta\sin\theta\sin\phi A_u E_u \qquad (10)$$

Certain symbols used in the foregoing expressions can be defined as follows:

$$A_u = 3 + 3u + u^2 \qquad (11)$$
$$B_u = 1 + u + u^2$$
$$E_u = e^{-u}$$
$$E_v = e^{-v}$$
$$I_0 = \frac{-u}{\sin^2\theta}(E_u - E_v)$$
$$I_1 = \frac{1}{\sin^2\theta}[2I_0 - u^2 E_u + (r/s)^2 uv E_v]$$

In the definitions recited in equation (11), the following variables can be defined: $u=-i\,k_h\,r$, $v=-i\,k_v\,s$, $k_h^2=-i\,\omega\mu\,\sigma_h$, $k_v^2=-i\,\omega\mu\,\sigma_v$, $r=(\rho^2+z^2)^{1/2}$, $s=(\rho^2+\lambda^2 z^2)^{1/2}$ and $\lambda=k_h/k_v$. Also in these expressions, $z=r\cos\theta$, $x=r\sin\theta\cos\phi$ and $y=r\sin\theta\sin\phi$. The various subscripted M values represent the magnetic moments of each of the transmitters (TX, TY, TZ, in FIGS. 3A, 3B) in the well logging instrument 10.

The "horizontal" conductivity, $\sigma_h$, defined previously as the conductivity in a direction parallel to the bedding planes, can then be determined from a low frequency approximation of the signal component $H_{zz}$ (which represents the $H'_{zz}$ component after it has been "rotated" into the coordinate system of the principal axes).

For an instrument such as the one described herein where the magnetic field components are measured using a so-called "three coil" system (including transmitter, bucking and main receiver coils) and the measurements are made at two frequencies as described earlier herein, the horizontal conductivity $\sigma_h$ can be determined by the expression:

$$\sigma_h = \frac{1}{f\mu}\left[\frac{3}{M_z}\frac{\sqrt{f_1}}{\sqrt{\pi}(1-\alpha^3)(\sqrt{f_1}-\sqrt{f_2})}\mathfrak{I}(H_{zz})\right]^{2/3} \qquad (12)$$

where $\mathfrak{I}(H_{zz})$ represents the imaginary part of the $H_{zz}$ component signal, and $\alpha$ represents a ratio of spacings between the particular transmitter and each of the two receiver coils (the main receiver coil and the bucking coil) used to measure the particular component signal. The vertical conductivity $\sigma_v$ and the anisotropy parameter $\lambda$ can be then determined from a low frequency approximation of component signal $H_{zz}$. First, the anisotropy parameter $\lambda$ can be calculated by the expression:

$$\frac{1}{\lambda^2} = \frac{1}{3}\left[\frac{4\mathfrak{I}(H_{xx})M_z}{\mathfrak{I}(H_{zz})M_x} - 1\right] \qquad (13)$$

and the vertical conductivity $\sigma_v$ can be calculated from the expression:

$$\sigma_v = \frac{\sigma_h}{\lambda^2} \qquad (14)$$

It should be noted that equation (12) can be used to calculate horizontal conductivity from the "rotated" $H_{zz}$ component where a well logging instrument such as described herein which makes measurements of receiver voltage at two frequencies is used. To practice this invention, however, it is not necessary to use an instrument such as the one described herein having "bucking" coils, nor is it necessary to make induction voltage measurements at two different frequencies. Appendices A and B include expressions derived for low frequency approximations using so-called "two-coil" systems, and for "three-coil" systems using only a single frequency alternating current for making measurements. So-called "two-coil" systems include only a single transmitter coil and a single receiver coil oriented along one of the X, Y, and Z-axes. A typical three-coil system is disclosed herein, where each of the X, Y, and Z-axes includes a transmitter coil oriented therealong, and main receiver and "bucking" coil oriented along each of the X, Y, and Z-axes. As previously explained, cross component receivers should be included in the logging instrument.

Figure 8:
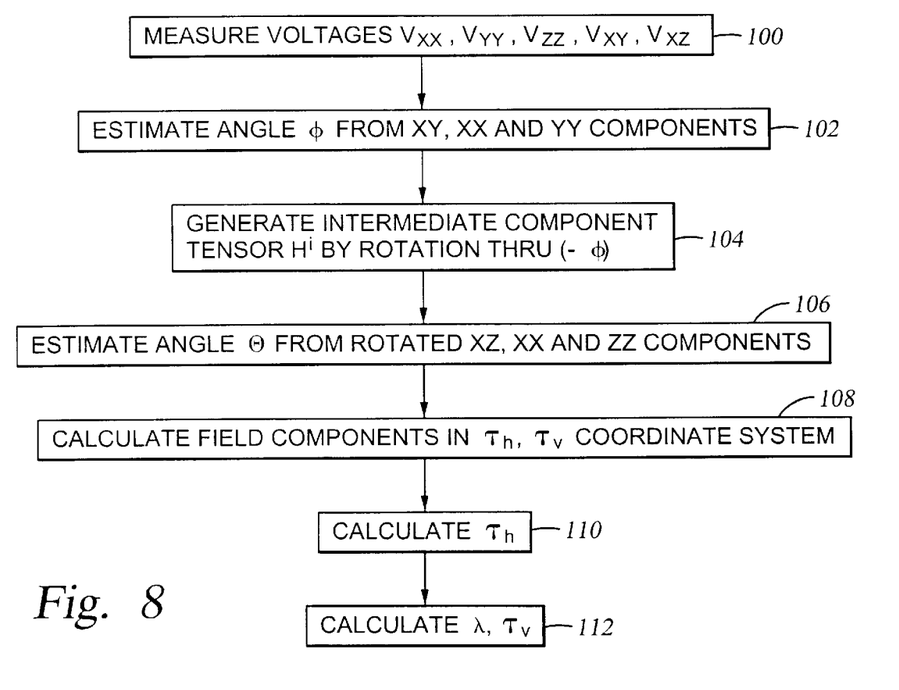
FIG. 8 is a flow chart of the process of generating initial estimates of the conductivity distribution surrounding the logging instrument.

FIG. 8 shows a flow chart of the process of the generating the initial estimate. Block 100 shows the measurements made of voltages induced in each of the receiver coils. The voltages, indicated as $V_{xx}$, $V_{yy}$, $V_{zz}$, $V_{xy}$, $V_{xz}$, by their subscripts represent the voltages induced in receiver coils oriented along the axis indicated by the second subscript letter, these voltages being induced by the transmitter coil oriented along the axis indicated by the first subscript letter. To practice this invention, it is only necessary to measure these five voltages having the indicated magnetic field orientations. Block 102 shows the step of estimating the angle $\phi$ from the XY, XX and YY receiver signals. After angle $\phi$ is estimated, the measurements are "rotated" through angle $(-\phi)$ to obtain the intermediate component tensor $H^i$, as shown in block 104. In block 106, angle $\theta$ can be estimated from the XZ, ZZ and XX components of the intermediate vector $H^i$. The estimate of angle $\theta$ is used, as shown in block 108, to calculate magnetic field components in the coordinate system of the anisotropy $\sigma_h$, $\sigma_v$. The horizontal conductivity is calculated as shown in block 110 from the magnetic field components in the anisotropy coordinate system, using a low frequency approximation selected from those such as shown in Appendix B, for the particular instrument coil arrangement and frequency measurement system actually used to make the induction voltage measurements. Finally, the anisotropy coefficient and vertical conductivity can be calculated as shown in block 112.

3. Generating Improved Values of Parameters from the Initial Estimate.

The process of generating an initial estimate of horizontal conductivity, anisotropy parameter, apparent "dip" angle and azimuth, as previously described, can be repeated for each of the seven "base" frequencies of the well logging instrument in FIG. 1. The result will be seven sets of initial estimates of horizontal conductivity, anisotropy parameter, dip angle and azimuth. These seven sets of initial estimates can then be entered into a feedforward neural network to generate a final ("improved") estimate of the horizontal conductivity, dip angle and azimuth.

The neural network model preferred for this invention is known as radial basis function (RBF) because of the relatively high training speed and accuracy. An RBF network includes 3 "layers" of units or neurons, the input layer, the hidden (or RBF) layer and the output layer. When an input vector, x, is presented to the network, the network responds with an output vector, y. The network output is simply a linear sum of certain radially symmetric functions. x and y are usually related as:

$$R(x) = G(\|x - x_j\|/\sigma_j); \quad (15)$$

$$y = w * R$$

where G represents a radially symmetric function, usually a Gaussian function, $X_j$ represents the centroid of the j-th RBF and is the mean value of the Gaussian, $\sigma_j$ represents the Gaussian width and R is the vector of $R_j$'s. w represents a coefficient vector of weights for the Gaussian functions.

Figure 9:
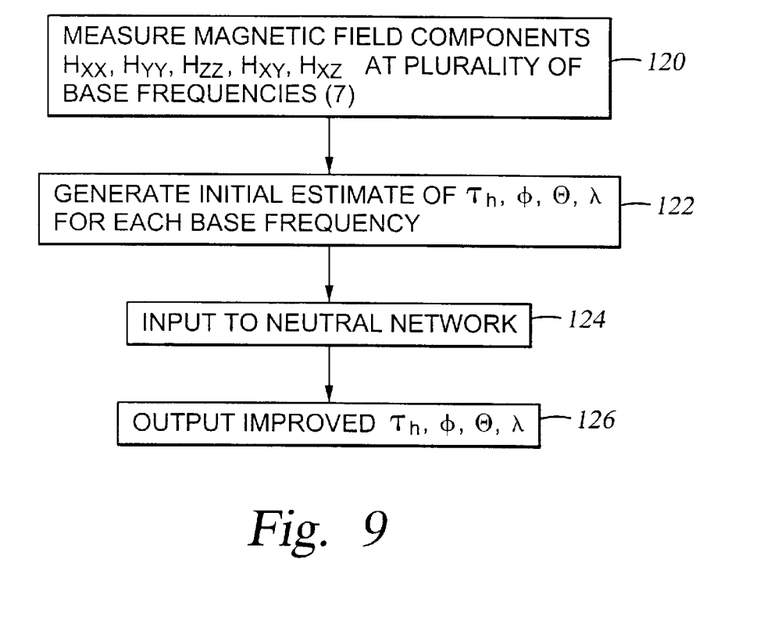
FIG. 9 shows a flow chart of the process of generating improved estimates using the trained neural network.

Using the neural network to generate the improved estimates is shown in FIG. 9. The voltages corresponding to the five magnetic field components for each of the seven base frequencies are measured, shown at box 120. The measured voltages are used to generate initial estimates for each base frequency, as shown at box 122. The initial estimates are input to the network, shown at box 124, and the improved estimate is the output of the network, shown at box 126.

Figure 10:
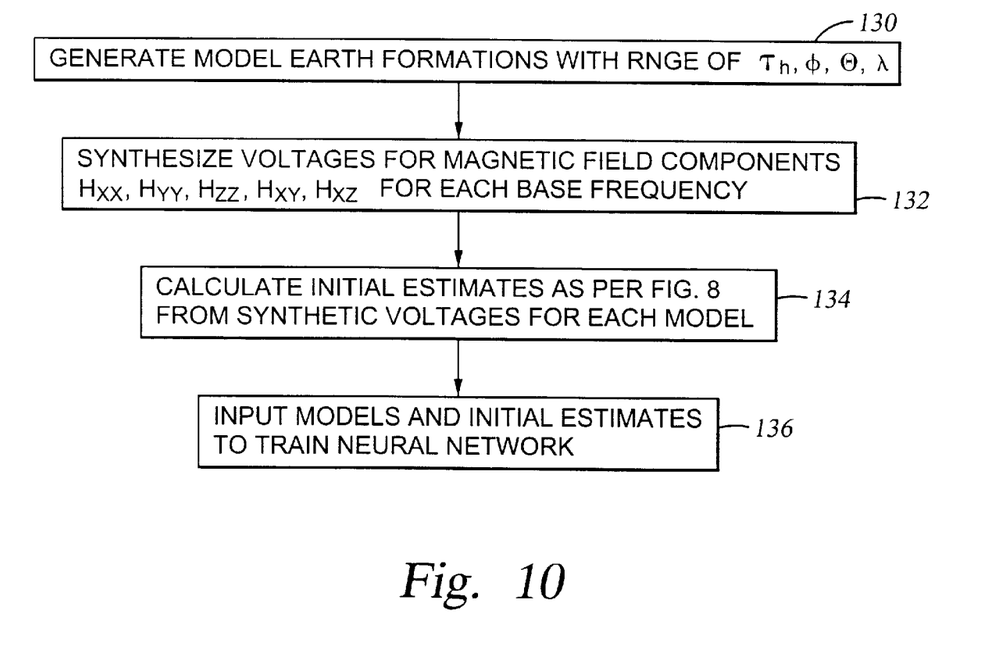
FIG. 10 shows a flow chart of the process of training the neural network.

Training the neural network includes generating a set of model earth formations, preferably randomly, each having known values of horizontal conductivity, anisotropy parameter, dip and azimuth angles. This is shown in FIG. 10 at box 130. The random set of earth formation models can then be used to synthesize the response of the well logging instrument. The synthetic response of the well logging instrument should include voltages for each of the five magnetic field components $V_{xx}$, $V_{yy}$, $V_{zz}$, $V_{xy}$, $V_{xz}$, at each of the seven base frequencies of the well logging instrument. This is shown at box 132 in FIG. 10. The synthesis will comprise a set of 35 voltages (corresponding to a magnetic field magnitude) for each "depth" level within each one of the random set of modeled earth formations. Equations which can be used to synthesize the voltage measurements for each model are shown in Appendices A and B which follow the description of this invention.

Each of the sets of synthetic voltage measurements can be used to calculate initial estimates, at each of the seven base frequencies, of horizontal conductivity, anisotropy parameter, dip and azimuth angle in the manner previously explained herein. This is shown in FIG. 10 at box 134. After calculating the initial estimates, the random set of modeled earth formations, having the known values of horizontal resistivity, anisotropy parameter, dip and azimuth angle can be entered into the feedforward neural network with the calculated initial estimates in order to train the neural network. As a large number of modeled earth formations and initial estimates are entered into the neural network, the network will "learn" the relationship between the "true" values of horizontal resistivity, anisotropy parameter, dip and azimuth angle from the model earth formations, and the initial estimates calculated from the synthetic voltage measurements. This is shown in FIG. 10 at box 136.

After such training, the neural network can be used to make more accurate estimates of the horizontal resistivity, anisotropy parameter, dip angle and azimuth angle for earth formations in an actual wellbore for which real signal voltages are measured during well logging operations, where the instrument passes through formations penetrated by the wellbore.

It should be understood that the invention is not limited to the radial basis function neural network model. The invention is also not limited to using voltage measurements from seven base frequencies. In practice, the method of this invention may use more or fewer base frequency measurements, with the understanding that more base frequencies may improve the accuracy of the estimates, while increasing the amount of training time and calculation time for the more accurate estimates output by the neural network.

It should also be understood that the improved estimate may include any one or all of the parameters horizontal conductivity, anisotropy parameter, apparent dip and azimuth. The neural network may be trained or otherwise operated to put only one or any ones of the parameters in the output for each calculation. It is not necessary, for purposes if this invention, to calculate a value of the final estimate for all four parameters.

Those skilled in the art will devise other embodiments of the invention which do not depart from the spirit of the invention as disclosed herein. Accordingly, the invention should be limited in scope only by the attached claims.

What is claimed is:

1. A method for generating an improved estimate of at least one of horizontal conductivity, dip angle, azimuth and anisotropy parameter of an earth formation penetrated by a wellbore, from dual-frequency transverse electromagnetic induction measurements of said formations, comprising:

generating an initial estimate of said at least one of horizontal conductivity, dip angle, azimuth and anisotropy parameter from said dual-frequency transverse induction measurements made at each one of a plurality of base frequencies;

imparting said initial estimates from each of said plurality of base frequencies into a trained neural network; and calculating said improved estimate using said trained neural network.

2. The method as defined in claim 1 wherein said neural network comprises a radial basis function model.

3. The method as defined in claim 1 wherein training of said neural network comprises:

generating models of earth formations each said model having a known value of said at least one of horizontal conductivity, anisotropy parameter, dip angle and azimuth;

synthesizing voltages which would be measured by said transverse electromagnetic induction logging instrument in response to each of said models;

calculating initial estimates from said synthesized voltages; and inputting said initial estimates and said known values from each of said models to said neural network to cause said network to learn a relationship between said initial estimates from said synthesized voltages and said known values.

4. The method as defined in claim 1 wherein generating said initial estimate comprises:

measuring electromagnetic induction signals induced by induction transmitters oriented along three mutually orthogonal axes, one of said axes substantially parallel to an instrument axis, said signals measured using first receivers each having a magnetic moment parallel to one of said orthogonal axes and second receivers each having a magnetic moment perpendicular to a one of said orthogonal axes which is perpendicular to said instrument axis, the method comprising;

calculating a relative angle of rotation of said one of said orthogonal axes which is perpendicular to said instrument axis, with respect to a direction of said horizontal conductivity, from said received signals measured perpendicular to said instrument axis;

calculating an intermediate measurement tensor by rotating magnitudes of said receiver signals through a negative of said angle of rotation;

calculating a relative angle of inclination of one of said orthogonal axes parallel to said axis of said instrument, with respect to said direction of said vertical conductivity, from said rotated magnitudes;

rotating said rotated magnitudes through a negative of said angle of inclination;

calculating said horizontal conductivity from said magnitudes of said receiver signals after said second step of rotation; and calculating an anisotropy parameter from said magnitudes after said second step of rotation and calculating said vertical conductivity from said horizontal conductivity and said anisotropy parameter.

5. A method for generating an improved estimate of at least one of horizontal conductivity, dip angle, azimuth and anisotropy parameter of an earth formation penetrated by a wellbore, comprising:

inserting a transverse electromagnetic induction logging instrument comprising mutually orthogonal transmitters and receivers and a dual-frequency alternating current source selectively connectable to each of said transmitters to induce alternating magnetic fields in said formations along an axis parallel thereto, said dual frequency source comprising a plurality of base frequencies;

detecting voltages at each said receiver corresponding to electromagnetic induction phenomena in said earth formation, said voltages including one component corresponding to reception along the same axis as each of said induced magnetic fields, and reception orthogonal to said induced magnetic fields;

generating an initial estimate of said at least one of horizontal conductivity, apparent dip angle, apparent azimuth and anisotropy parameter from said detected voltages at each one of said plurality of base frequencies;

imparting said initial estimates from each of said plurality of base frequencies into a trained neural network; and calculating said improved estimate using said trained neural network.

6. The method as defined in claim 5 wherein said neural network comprises a radial basis function model.

7. The method as defined in claim 5 wherein training of said neural network comprises:

generating models of earth formations each said model having a known value of said at least one of horizontal conductivity, anisotropy parameter, dip angle and azimuth;

synthesizing voltages which would be measured by said transverse electromagnetic induction logging instrument in response to each of said models;

calculating initial estimates from said synthesized voltages; and inputting said initial estimates and said known values from each of said models to said neural network to cause said network to learn a relationship between said initial estimates from said synthesized voltages and said known values.

8. The method as defined in claim 5 wherein generating said initial estimate comprises:

measuring electromagnetic induction signals induced by induction transmitters oriented along three mutually orthogonal axes, one of said axes substantially parallel to an instrument axis, said signals measured using first receivers each having a magnetic moment parallel to one of said orthogonal axes and second receivers each having a magnetic moment perpendicular to a one of said orthogonal axes which is perpendicular to said instrument axis, the method comprising;

calculating a relative angle of rotation of said one of said orthogonal axes which is perpendicular to said instrument axis, with respect to a direction of said horizontal conductivity, from said received signals measured perpendicular to said instrument axis;

calculating an intermediate measurement tensor by rotating magnitudes of said receiver signals through a negative of said angle of rotation;

calculating a relative angle of inclination of one of said orthogonal axes parallel to said axis of said instrument, with respect to said direction of said vertical conductivity, from said rotated magnitudes;

rotating said rotated magnitudes through a negative of said angle of inclination;

calculating said horizontal conductivity from said magnitudes of said receiver signals after said second step of rotation; and calculating an anisotropy parameter from said magnitudes after said second step of rotation and calculating said vertical conductivity from said horizontal conductivity and said anisotropy parameter.

* * * * *